May 8, 1934.  R. MICEK  1,957,897
INCLINOMETER
Filed June 6, 1932
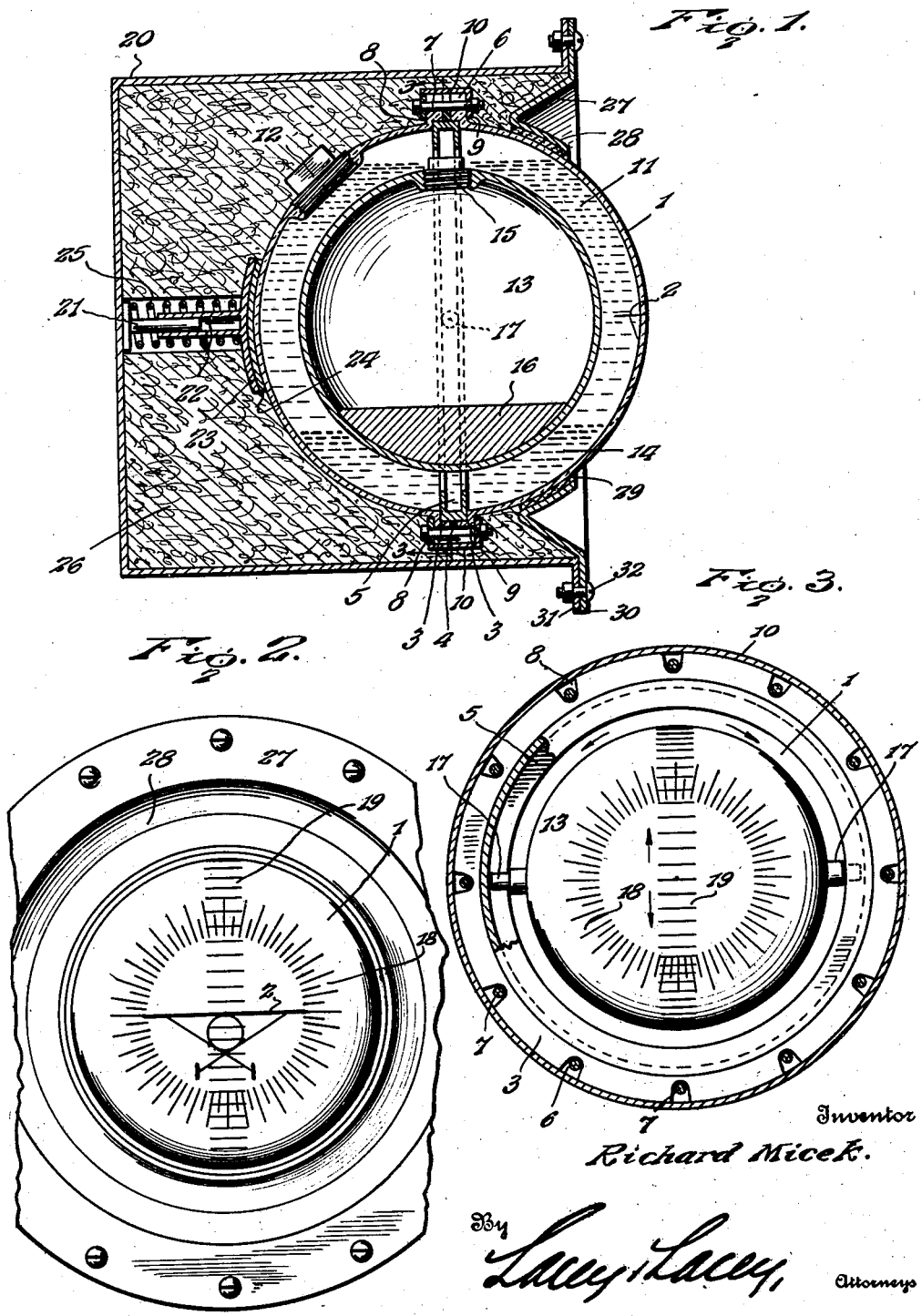

Patented May 8, 1934

1,957,897

UNITED STATES PATENT OFFICE 1,957,897

INCLINOMETER

Richard Micek, San Diego, Calif.

Application June 6, 1932, Serial No. 615,703

3 Claims. (Cl. 33—206)

The present invention seeks to provide a very simple and efficient device for mounting upon the instrument board of an airplane whereby the aviator will be visually informed as to whether or not the ship is sailing on an even keel or in what direction and to what degree it is inclined. The invention is illustrated in the accompanying drawing and will be hereinafter first fully described and then more particularly defined in the appended claims.

In the drawing,

Figure 1 is a vertical section through a device embodying the present invention, Fig. 2 is an elevation of the same, Fig. 3 is a transverse section on the line 3—3 of Fig. 1.

In carrying out the invention, there is provided a hollow spherical body or globe 1 which is preferably of glass so that the interior thereof may be easily seen and read. Instead of being entirely of glass, the sphere may be reinforced with a metallic frame, if so desired, but the portion thereof presented to the aviator, when the device is in position, should be transparent. Upon the surface presented to the aviator, there is painted, or otherwise displayed, the representation of an airplane, as indicated at 2, the wings of the airplane being disposed on a diameter of the sphere so that it will be horizontal when the ship is sailing on an even keel. This spherical body is preferably constructed in two parts, as shown most clearly in Fig. 1, the mating diametrical edges of the two parts being constructed with overhanging flanges, as shown at 3, a gasket 4 of rubber or some other suitable material being inserted between said edges to avoid leakage. Fitted in the annular recesses defined by the overhanging flanges 3 is an internally grooved or channeled ring 5 the purpose of which will presently appear. The flanges 3 are constructed with notches 6 at intervals to receive securing bolts 7 which pass through the flanges and through an annulus 8 which is disposed against the outer side of one flange and also through an annulus 9 disposed against the outer side of the other flange, the latter annulus having an extension 10 which encircles both flanges so that the flanges will be housed within a channel. This described construction facilitates the assembling of the device and also provides a very secure fastening for the two parts of the spherical body. This spherical body 1 is intended to receive a suitable liquid, such as glycerine, as indicated at 11, and to admit the liquid to the body, a filling opening is provided at any proper point in the same and normally closed by a plug 12. It is intended that the liquid, indicated at 11, be sufficient to maintain an inner spherical body 13 in concentric spaced relation to the outer spherical body 1 and, if desired, a portion of a heavier liquid, such as mercury, indicated at 14, may be supplied to the spherical body 1, at the bottom of the same, so as to support the inner globe when variations in temperature are apt to reduce the density of the glycerine or other submerging and supporting liquid.

The inner globe 13 is preferably of glass or some similar transparent material and is provided, at one point, with an opening, normally closed by a plug 15, to facilitate the introduction of a weight 16 which may be of any suitable material, the purpose of this weight being to maintain the inner globe submerged within the dampening liquid in the outer globe and also maintain the indications upon the inner globe in proper relation to the emblem or indicia upon the outer globe. The inner globe is provided at diametrically opposite points with studs 17 which engage in the channel or groove of the ring 5 and thereby aid in maintaining the proper spaced relation of the two globes while permitting free relative movement thereof. It will be readily noted that the arrangement permits the inner globe to remain substantially in a stable position while the outer globe may rotate freely about the inner globe in all directions. Upon the face of the inner globe is inscribed an annular scale 18, the diameters of which may coincide with the indicator 2 upon the outer globe, and there is also provided an annular band of graduations 19 which extend vertically upon the face of the inner globe. If the ship be sailing upon a truly even keel, the indicator 2 will be horizontal and on a diameter of the circular scale 18. Should the ship dip or tilt, the degree of such tilting or dipping, as well as the direction of the same, will be easily shown upon the instrument inasmuch as the outer globe is fixed upon the ship and the position of the indicator 2 thereon will, consequently, always correspond to the position of the ship relative to a vertical plane and the variation from the strictly even keel will be indicated by the varying relation of the indicator 2 to the scales upon the inner globe.

The outer globe is mounted in a case 20 which is secured upon or in the instrument board of the ship in such position that the device will be directly within the range of vision of the aviator. This case 20 may be of any suitable design and has an open side which is presented to the aviator. Within the case, at the side opposite the open side, there is mounted a stem 21 having a tube 22 slidably mounted thereon, the end of the tube 22 carrying a shoe 23 which includes a facing of rubber, leather or some other material, indicated at 24, which is adapted to bear upon the globe 1 and exert friction thereon sufficient to hold the globe firmly against movement within the case without fracturing the globe. An expansion spring 25 is fitted about the stem 21 and tube 22 and bears against the shoe 23 so as to hold the same firmly, but yieldably, against the spherical body. The case is filled with some packing material, indicated at 26, which will fit entirely around the globe 1 and support the same without crushing it. Possible vibration is thus cushioned so that the globe will not be shattered but will remain intact under all normal conditions. In the front of the case 20 is secured an annular cover plate 27 which has an inner portion 28 shaped to fit closely to and conform to the surface of the outer globe 1 and this annular portion 28 is provided with a facing 29 of leather, rubber or similar material so that, while the globe will be properly supported, it will be cushioned at all points of support and guarded against friction. The cover or closing plate 27 is provided with an outstanding marginal portion 30 which bears against a flange 31 on the case, and fastening screws 32 are inserted through said marginal portion and the flange to secure the cover plate in position.

From the foregoing description, taken in connection with the accompanying drawing, it will be seen that I have provided an exceedingly simple and compact device which may be produced at a low cost and readily mounted upon the instrument board of an airplane. The device will respond quickly to the variations of the ship from an even keel so that the aviator, at all times, will be visually advised as to the position in which his ship is sailing, the device being particularly advantageous when flying at night or in foggy or stormy weather.

Having thus described the invention, I claim,

1. An instrument for the purpose set forth comprising a case, an outer globe mounted in the case, packing in the case bearing against the globe to cushion the same, a friction device in the case engaging the globe to hold it in a relatively fixed position, and an inner globe in floating concentric relation to the outer globe, there being co-related indicia on the surfaces of the two globes.

2. An instrument of the type described comprising a case, an outer globe fitted in the case, packing in the case surrounding the globe, a cover plate secured over one side of the case and conforming to the globe, a facing strip on said cover plate frictionally engaging the globe, a shoe within the case having a facing frictionally engaging the globe, and yieldable means within the case holding said shoe to the globe.

3. An instrument of the type described comprising an inner globe, an outer globe consisting of two hemispheres having overhanging flanges at their meeting diametrical edges, an internally grooved ring engaged in and held between said flanges, diametrically opposite studs on the inner globe engaging in the groove of said ring, annular clamping plates fitted against the outer sides of the flanges, and clamping bolts inserted through said plates and said flanges.

RICHARD MICEK. [L. S.]